(12) United States Patent
Landrot

(10) Patent No.: US 7,328,660 B2
(45) Date of Patent: Feb. 12, 2008

(54) FLEXIBLE CONNECTION DEVICE BETWEEN A BOGEY SIDE BEAM AND AN AXLE-BOX

(75) Inventor: Alain Landrot, Le Creusot (FR)

(73) Assignee: Alstom, Levallois Perret (FR)

( * ) Notice: Subject to any disclaimer, the term of this patent is extended or adjusted under 35 U.S.C. 154(b) by 0 days.

(21) Appl. No.: 10/997,913

(22) Filed: Nov. 29, 2004

(65) Prior Publication Data

US 2005/0116436 A1 Jun. 2, 2005

(30) Foreign Application Priority Data

Dec. 2, 2003 (FR) .................................. 03 50958

(51) Int. Cl.
*B61F 5/26* (2006.01)
(52) U.S. Cl. .................................. 105/218.2
(58) Field of Classification Search ............ 105/182.1, 105/190.2, 193, 217, 218.1, 218.2
See application file for complete search history.

(56) References Cited

U.S. PATENT DOCUMENTS

| | | | |
|---|---|---|---|
| 4,332,201 A * | 6/1982 | Pollard et al. .............. | 105/167 |
| 4,742,779 A * | 5/1988 | Bevand ....................... | 105/167 |
| 5,611,284 A * | 3/1997 | Smith et al. ................ | 105/220 |
| 6,053,112 A * | 4/2000 | Jones, Jr. ................... | 105/218.1 |
| 6,119,602 A * | 9/2000 | Yoshino ..................... | 105/218.1 |

FOREIGN PATENT DOCUMENTS

| | | |
|---|---|---|
| EP | 0 326 179 A | 8/1989 |
| EP | 0 542 722 A | 5/1993 |
| EP | 0 983 922 A | 3/2000 |
| FR | 1 253 350 A | 2/1961 |
| FR | 1 536 401 A | 8/1968 |
| GB | 648516 A1 | 1/1951 |
| GB | 835 010 A | 5/1960 |
| GB | 935 841 A | 9/1963 |

OTHER PUBLICATIONS

Paulstra-Laminated-Support.pdf, relative to secondary suspensions, p. 21.
Sandwich Mounting, http://www.paulstra-vibrachoc.com/Sandwich_mounting_GB.pdf, pp. 82-84.

* cited by examiner

*Primary Examiner*—S. Joseph Morano
*Assistant Examiner*—Robert J. McCarry, Jr.
(74) *Attorney, Agent, or Firm*—Sughrue Mion pllc.

(57) ABSTRACT

The flexible connection device of the invention is disposed between a flexible side beam of a bogey frame and an arm of an axle-box, and wherein the stiffness of the connection is greater in the vertical direction (Z) than in the two horizontal directions (X, Y). This enables the side beam to be decoupled from the axle-box, thereby reducing the stresses at the interfaces between these parts when the bogey frame moves transversely and vertically relative to the axles. This also presents the advantage of allowing relative displacements between the side beam and the axle-box.

8 Claims, 3 Drawing Sheets

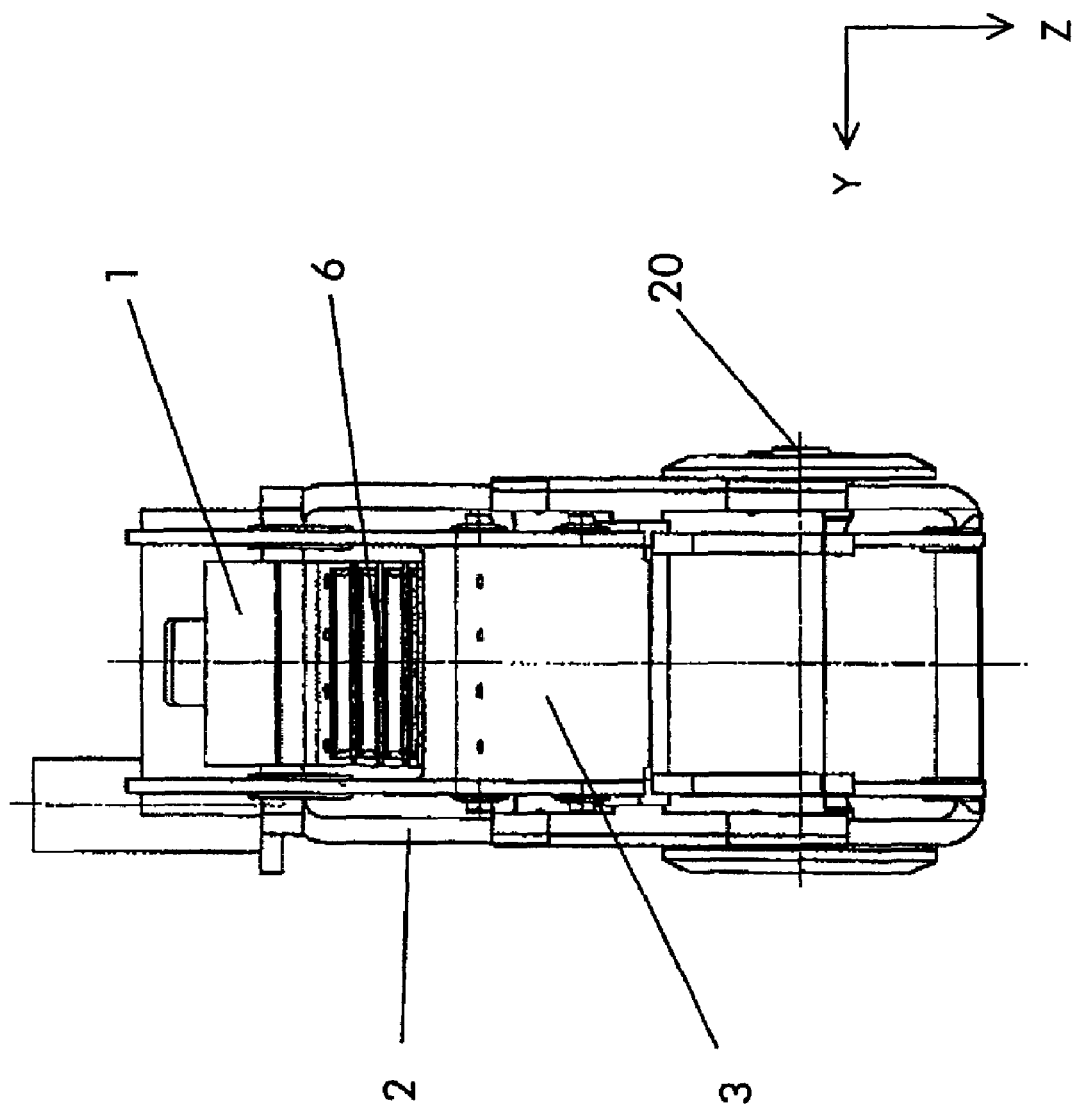

FLEXIBLE CONNECTION DEVICE BETWEEN A BOGEY SIDE BEAM AND AN AXLE-BOX

The present invention relates to rail vehicle bogeys, and more particularly to the connection between a bogey side beam and an axle-box.

BACKGROUND OF THE INVENTION

Conventionally, this connection is made by a helical spring coupled to a shock absorber which absorbs the shocks or displacements transmitted by the frame to the bogey structure. Nevertheless, that construction is heavy and penalizes the performance of bogeys fitted therewith.

Direct connections are also known between the axle and the side beam (and not the axle-box) implemented by metal or composite spring blades replacing conventional side beams. However, although blades of that type withstand bending well, they do not allow for transverse displacements which are therefore transmitted directly to the frame which can lead to wear of the fastenings and to risks of breakage, and reduces the lifetime of bogeys of that type.

OBJECTS AND SUMMARY OF THE INVENTION

The object of the present invention is to provide a connection device which absorbs forces in the manner of helical springs and which is compatible with spring blades, while also accommodating appreciable displacements between the parts it interconnects.

The flexible connection device of the invention is located between a flexible side beam of a bogey frame and an arm of an axle-box, wherein the stiffness of the connection is greater in the vertical direction (Z) than in the two horizontal directions (X, Y). This makes it possible to decouple the side beam from the axle-box and thus to reduce the stresses applied to the interfaces of those parts when the bogey frame moves transversely and vertically relative to the axles. This thus presents the advantage of allowing relative displacements between the axle-box and the side beam, which is flexible. This disposition makes it possible in particular to avoid transferring forces onto the spring blade in the Y direction, thereby avoiding damage to the structure of the frame.

According to a particular characteristic, the stiffness of the connection in the vertical direction (Z) is at least ten times greater than the stiffness in the two horizontal directions (X, Y).

According to a particular characteristic, the connection is made of elastomer. This material serves to reduce the transmission of noise by the solid elements (solid noise) from the rail to the body, and filtering may extend up to 1.5 kilohertz (kHz) or even 2 kHz. Furthermore, positioning this elastomer very far upstream stops solid noise, i.e. noise generated by solids, much further upstream than does a conventional suspension where the noise is not stopped until secondary damping or the secondary suspension which therefore involves many more parts and parts that are much bulkier and therefore more difficult to filter.

Advantageously, the elastomer is a laminated elastomer with a plane metal strength member. This type of elastomer is much more compact while also being much more flexible in the horizontal plane.

In a variant, the connection is made using natural rubber. The cost of this material is relatively low. It is also more flexible. Since stiffness is a function of thickness, the rubber will be in the form of a block.

Connections of these types made of elastomer or of natural rubber also enable the suspension to be adjusted by adding spacers while setting the bogey or modifying the vertical stiffness by adding another element of rubber or elastomer, whether laminated or otherwise.

According to a particular characteristic, the flexible side beam is made of composite material. The device may be screwed onto metal plates that are adhesively bonded to said side beam. The use of a composite material provides a significant weight saving and allows the parts to be adhesively bonded.

According to another characteristic, the flexible side beam acts as the primary suspension of the bogey. This enables the device to transfer exclusively the vertical load to the axles. Relative displacement between the flexible side beam and the axle-box for correcting the support length during changes in loading, due to the side beam bending, do not need to be absorbed by using expensive hinges that are subject to wear such as spring shackles, a technique which is commonly used for fixing spring blades in road vehicles.

BRIEF DESCRIPTION OF THE DRAWINGS

The invention will be better understood on reading the following description given purely by way of example and made with reference to the accompanying drawings, in which:

FIG. 3 is an end view of the device of the invention.

MORE DETAILED DESCRIPTION

Figure 1:
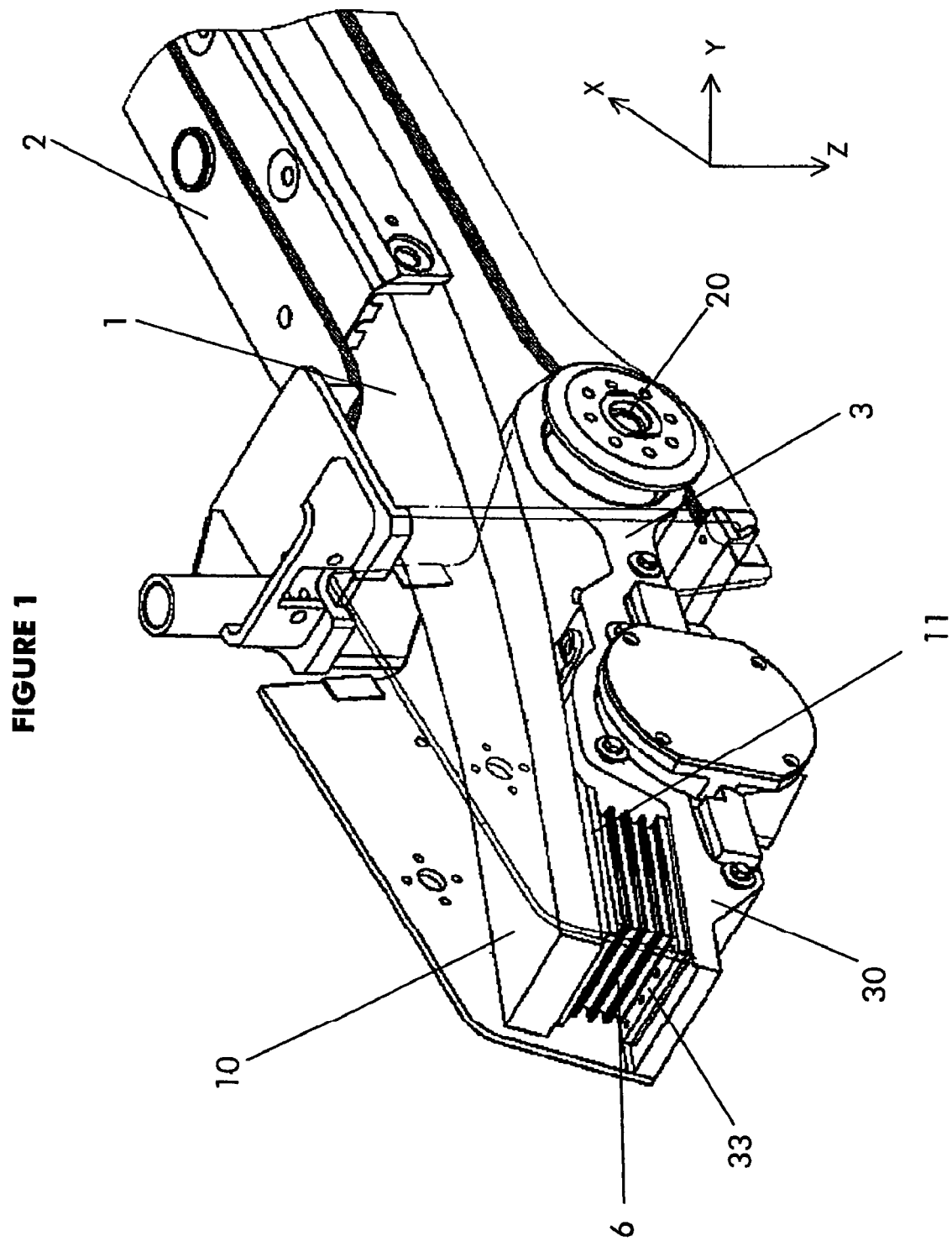
FIG. 1 is a perspective view of the device of the invention with its parts drawn as being transparent.
Figure 2:
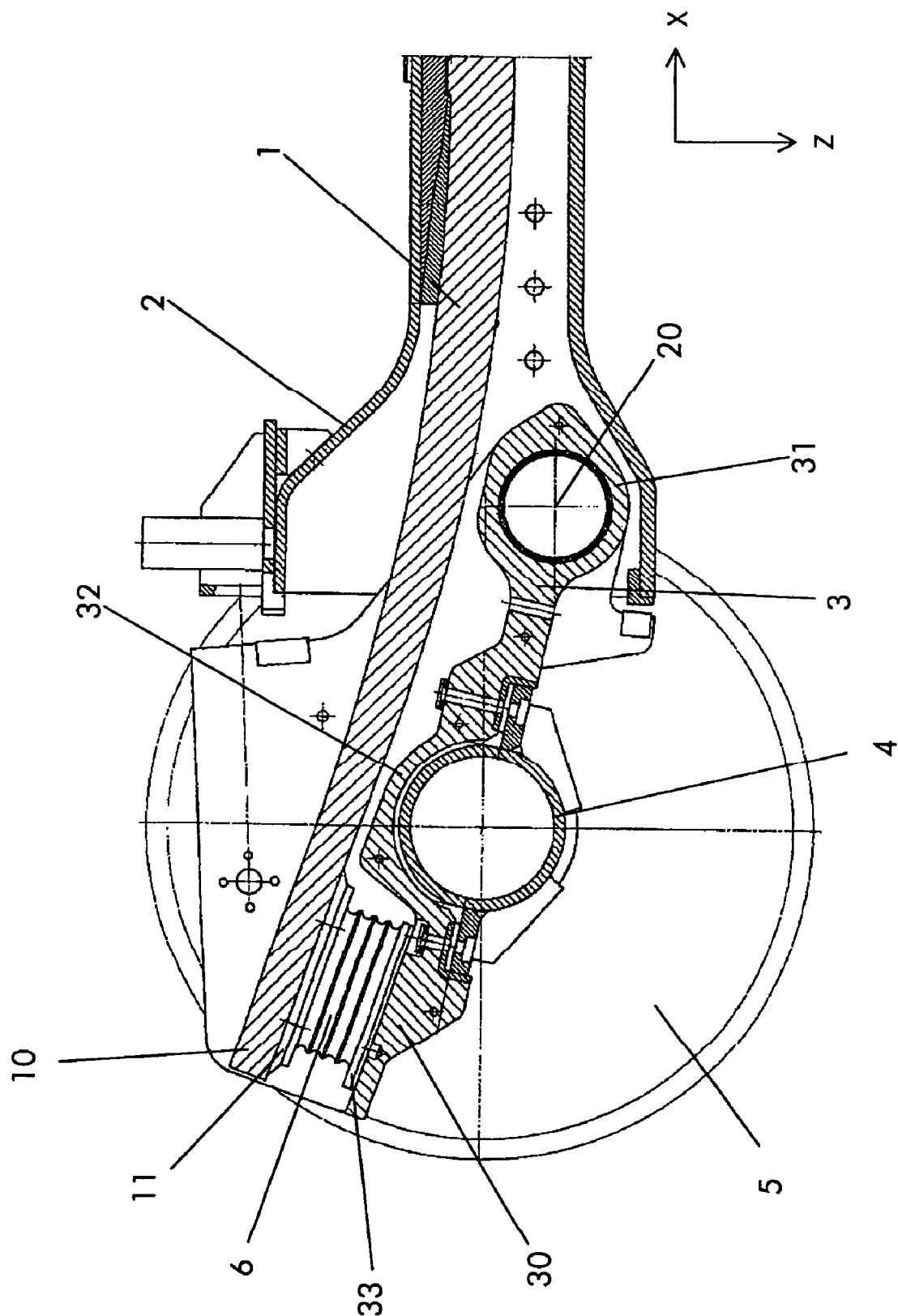
FIG. 2 is a side view of the device of the invention.

The bogey is symmetrical and comprises two side beams, constituted by resilient blades 1 in a structure 2, as can be seen in FIG. 1, with an axle-box 3 at each end of the bogey for supporting an axle 4 together with its pair of wheels 5.

A connection 6 is interposed between each blade 1 and the end 30 of the axle-box 3. This connection is made out of laminated elastomer in the example shown in the various figures.

The blade 1 is secured to the structure 2 by welding, bolting, or adhesive-bonding, or by any other technique known to the person skilled in the art.

The axle-box or arm-box 3 is hinged to the structure 2 about a pin 20 at one end 31 of the main core, with the axle 4 being connected conventionally to the axle-box 3 in an intermediate portion 32 of the core, while the connection is made to the opposite end 30 of the core. The main core is made up of portions 30, 31, and 32 and it is also referred to as the core of the arm-box.

The connection element 6 has one face bolted to a plate 11 which is secured to the blade 1 by adhesive-bonding, and has its opposite face bolted to a plate 33 which is secured to the axle-box 3. It is possible to replace bolting of the plate 11 by positioning by means of four pegs (for example), since by construction the element 6 is always in compression between the blade 1 and the axle-box 3.

When the bogey is loaded, the blade 1 bends vertically in the Z direction, with the end 10 of the blade 1 moving horizontally in the X direction and the connection element 6 deforming to absorb the change in the support length while conserving the vertical force applied to the top portion of the axle-box 3.

When stress is applied transversely, as when following a curve or traveling over switches or "points", the axle-box 3 is subjected to horizontal forces acting in the Y direction. The high degree of transverse rigidity of the blade 1 means that it is the connection element 6 which is subjected to horizontal deformation since it is more flexible.

What is claimed is:

1. A flexible connection device (6) disposed between a flexible side beam (1) and an arm of an axle-box (3),
    wherein the flexible side beam (1) is secured to a bogey frame (2),
    wherein the side beam (1) comprises a flexible blade which is operative to bend in a vertical direction (Z), and wherein the stiffness of the connection device (6) is greater in the vertical direction (Z) than in the two horizontal directions (X, Y).

2. A device according to claim 1, wherein the stiffness of the connection device (6) in the vertical direction (Z) is at least two times greater than the stiffness in the two horizontal directions (X, Y).

3. A device according to claim 1, wherein the connection device (6) is made of elastomer.

4. A device according to claim 3, wherein the elastomer is a laminated elastomer having plane metal strength members.

5. A device according to claim 1, wherein the connection device (6) is made of natural rubber.

6. A device according to claim 1, wherein the side beam (1) is made of composite material.

7. A device according to claim 6, wherein the connection device (6) is screwed to metal plates adhesively bonded to the side beam (1).

8. A device according to claim 1, wherein the flexible side beam (1) acts as the primary suspension of the bogey.

* * * * *